United States Patent Office 3,432,529
Patented Mar. 11, 1969

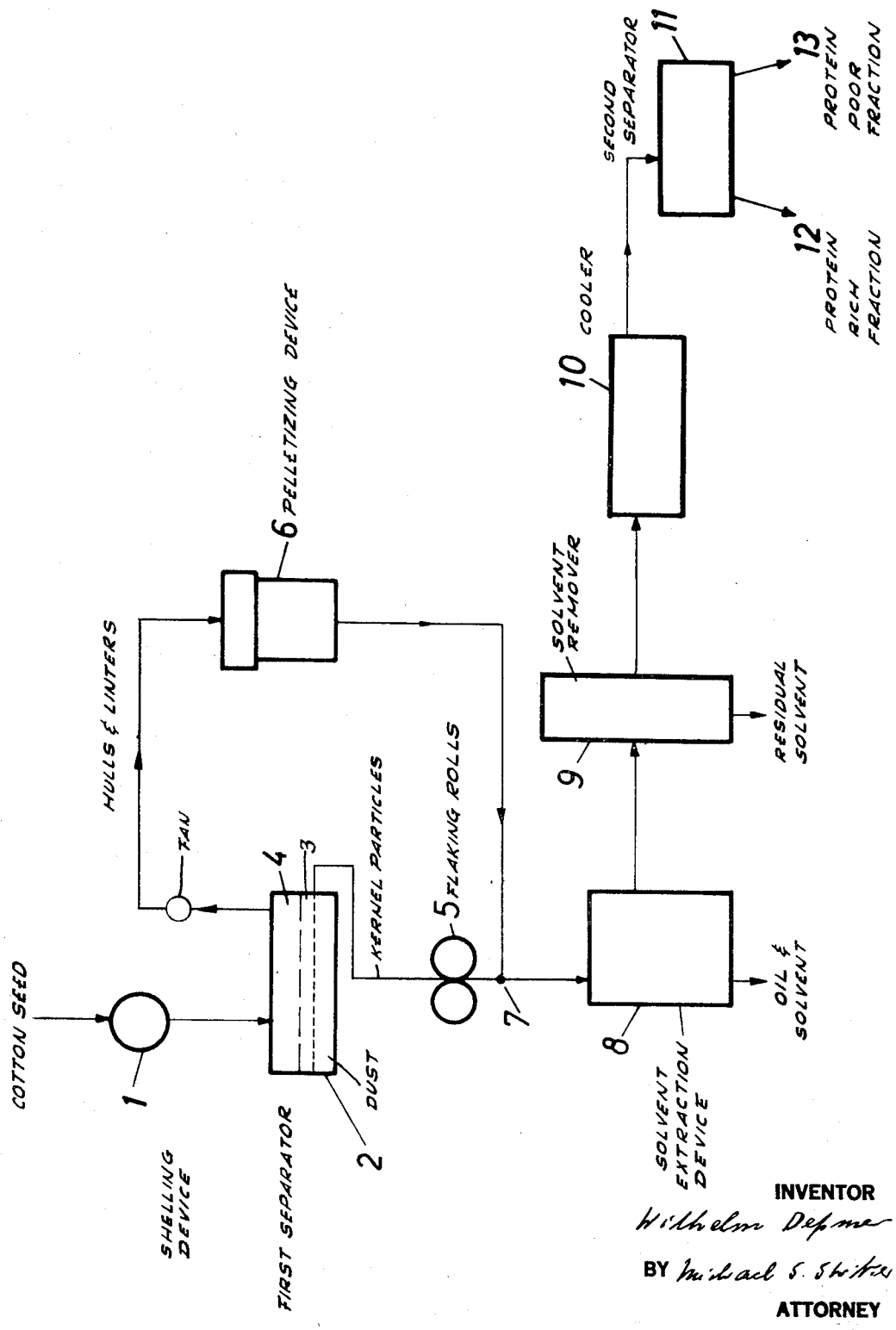

3,432,529
METHOD AND APPARATUS FOR THE EXTRACTION OF OIL FROM COTTONSEED
Wilhelm Depmer, 86 Kielmannseggstrasse 2, Hamburg-Wandsbek-Marienthal, Germany
Filed Oct. 14, 1966, Ser. No. 586,900
Claims priority, application Germany, Oct. 15, 1965,
D 48,434
U.S. Cl. 260—412.4
Int. Cl. C09f 5/02
5 Claims

ABSTRACT OF THE DISCLOSURE

A method and an arrangement for the extraction of oil from cottonseed in which the cottonseed kernels are separated from the hulls and linters and flaked, whereas the hulls and linters are pelletized, whereafter the pelletized hulls and linters are mixed with the flaked kernels and oil is extracted from the mixture.

---

The present invention relates to a method and apparatus for the extraction of oil from vegetable seed material and, more particularly, the present invention is concerned with the extraction of oil from cottonseed.

Cottonseed contains a considerable proportion of valuable oil and, in view thereof, it is customary to extract cottonseed so as to recover oil therefrom.

Generally, the cottonseed is directly subjected to solvent extraction, however, several disadvantages and difficulties are connected with such methods.

The various constituents of the cottonseed such as linters, the material of the kernel and the hulls are of very different structure and, by extracting the entire cottonseed mass, including hulls, linters and kernels, the differences in the characteristics of these constituents have a mutually disadvantageous effect on the extraction of oil therefrom.

The features which are important in the oil extraction process include rather complete extraction, so that the residual oil in the cottonseed mass amounts to as little as possible, as well as safe and reliable operation which can be carried out without breakdowns, and, generally, an economical operation.

The problems start with the feeding of the cottonseed into the comminuting devices. At this point already the linters which generally are present in an amount of between about 2 and 10% of the weight of the mass interfere with the desired operation due to the wool-like fibrous and voluminous structure, so that the smooth flow required for continuous operation is impeded.

The cells of the kernels of the cottonseed do not release their oil content upon solvent extraction as easily as other oil seeds such as soybeans. It is therefore necessary to comminute the cottonseed kernels to a relatively small size prior to solvent extraction, preferably into flakes having a thickness of between 0.2 and 0.25 millimeter. However, in the presence of the cottonseed hulls which have a thickness of between 0.3 and 0.4 mm., such flaking of the kernels to the desired thinness is extremely difficult.

To the extent to which the linters of the cottonseed are present in a free and unbound form in the mass which is to be subjected to extraction, these linters interfere with preparation of the extraction, the extraction itself, particularly percolation and filtration, since fiber bundles are formed which lead to blocking, plugging up and the like. Furthermore, the free linters require an extraction apparatus of larger volume and retain liquid solvent as well as oil.

For achieving the desired extraction effect, it is important that the material which is subjected to extraction can be easily percolated. Thus, for instance the presence of very fine particles should be avoided as far as possible since particularly very finely comminuted kernel particles interfere severely with the percolations.

It is therefore an object of the present invention to overcome the above discussed difficulties and disadvantages in the conventional solvent extraction of cottonseed and the like.

It is another object of the present invention to provide a method and apparatus for the solvent extraction of cottonseed which can be carried out in a simple and economical manner and will give a high yield of extracted oil.

It is yet another object of the present invention to provide a method and apparatus for the solvent extraction of cottonseed which will permit recovery of an extracted, protein-rich fraction.

It is still another object of the present invention to provide a method and apparatus for the solvent extraction of cottonseed and the like which will give a high yield per unit volume of extraction apparatus.

Other objects and advantages of the present invention will become apparent from a further reading of the description and of the appended claims.

With the above and other objects in view, the present invention contemplates in a method of extracting oil from cottonseed, the steps of separating a mass of cottonseed into a first fraction consisting predominantly of cottonseed kernels and into a second fraction consisting predominantly of hulls and linters, flaking the first faction, and pelletizing the second fraction, prior to extracting oil from the thus treated mass.

The present invention also provides in an arrangement for the extraction of oil from cottonseed, in combination, separating means for separating a mass of cottonseed into a first fraction consisting predominantly of cottonseed kernels and into a second fraction consisting predominantly of hulls and linters, flaking means operatively associated with the separating means for flaking the separated cottonseed kernels, pelletizing means operatively associated with the separating means for pelletizing the separated hulls and linters, and mixing means operatively associated with the flaking means and the pelletizing means for forming a mixture of the flakes and pellets produced in the flaking and pelletizing means.

It has thus been found that by utilizing a different arrangement and different type of machinery in the preparation of the cottonseed for oil extraction therefrom, the above-discussed difficulties and disadvantages can be avoided and several advantages obtained. Conventionally, the comminution of oil seeds is carried out with grooved crushing rolls and smooth roller arrangements.

However, in accordance with the present invention, the cottonseed is first separated by shelling into two fractions of preferably about substanitally even weight, of which one fraction, namely the kernel fraction, is flaked, whereas the hull fraction which also includes the linters is pelletized, and thereafter, both fractions are preferably combined prior to extraction of the same. Thus, a shelling device for the entire cottonseed replaces the grooved rolling mills, and with respect to the hull and linter fraction, the pelletizing device replaces the smooth rollers.

Consequently, according to the present invention, the preparation of the cottonseed for extraction takes place in two parallel lines.

During such preparation, two fractions are formed, namely:

(1) About 50% of the cottonseed which consists essentially of cottonseed kernel portions are directly flaked in a conventional flaking roller arrangement to the desired thickness of preferably between 0.2 and 0.25 mm. This fraction also has a high protein content.

(2) About 50% of the weight of the original cottonseed mass, consisting of hulls, linters and a smaller proportion of fine kernel particles which firmly adhere to the hulls are passed through a pelletizing device to form pellets thereof. These pellets have an average fat content of only about 10% and are low in protein.

Thereafter, preferably, the two thus-treated fractions are combined and then subjected to solvent extraction for recovery of oil therefrom.

By proceeding in this manner, the difficulties and disadvantages of the prior art which were discussed further above are avoided.

The feeding of the linter-containing cottonseed into the arrangement is simplified, the separated kernels can be easily flaked, down to the required small cross-sectional dimensions, the linters are bound together with the hull fraction and thus cannot form fiber bundles and the like, the entire material, i.e., the mixture of the flakes and pellets can be easily subjected to percolation and the extraction can be carried out without difficulties and with better utilization of the volume of the extraction device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the figure is a schematic illustration of an arrangement according to the present invention.

Referring now to the figure, it will be seen that the entire mass of cottonseed is first introduced into the shelling device or huller 1. There are two fractions formed therein, namely the kernel fraction and the hull and linter fraction with some kernel material adhering thereto. These two fractions are then separated from each other in screening device 2 into a first fraction 3 which substantially consists of cottonseed kernel particles, and into a second fraction 4 which consists essentially of hulls, linters, and a smaller proportion of kernel particles which adhere to the hulls.

The first fraction 3 is then passed through flaking rollers 5 and flaked therein to the desired cross-sectional dimensions, whereas second fraction 4 is passed to a pelletizing device 6. By pelletizing the hull and linter portions, the same are transformed into bodies of advantageous dimensions for the purpose of the subsequent extraction of the same.

The flaked and pelletized fractions are then combined at 7 and the thus-formed mixture is passed through solvent extraction device 8.

Oil is extracted from the mixture and withdrawn from extraction device 8 together with solvent. The extracted mixture is passed to the device indicated by reference numeral 9 wherein residual solvent is removed therefrom. The hot mixture obtained after removal of residual solvent in device 9 is then passed through cooler 10 and from there into separating, preferably screening, device 11 in which the extracted, solvent-free and cooled mixture is separated into protein-rich extracted flakes and into extracted pellets which are relatively poor in protein. The protein-rich fraction is withdrawn from separator 11 through conduit 12 and the protein-poor fraction through conduit 13.

The following example is given as illustrative only without, however, limiting the invention to the specific details of the example.

Example

In the manner illustrated in the drawing, between about 50 and 1,000 tons of cottonseed per day may be extracted. The original cottonseed has an oil content of about 18–25% and a moisture content of between about 8 and 10%.

A huller 1 cuts the hulls and linters from the kernels. Such huller, a per se conventional machine, consists of a rotating cylinder carrying several rows of knives passing a concave wall holding several rows of stationary knives. The apparatus is designed for free cutting action without crushing the seed.

The thus cut material is discharged from the huller and introduced into a separator 2, for instance a vibrating screen separator, wherein the cut material is separated into two fractions, namely:

(1) a meat or kernel fraction with only a very small portion of fine hull particles. The oil content of this fraction is between about 30 and 35%.

(2) a fraction consisting of hulls and linters and including only a small proportion of meat or kernel particles. The oil content of this fraction is between about 10 and 15%.

The separator preferably is equipped with two movable screens. Most of the hulls and linters remain on the upper screen and are sucked off at the end of the tray where also fine hull particles are sucked off, and the sucked off material is pneumatically conveyed to a pellet mill 6. The meat or kernel particles which pass through the screen onto the second screen and are separated thereon from dust and the like are then mechanically conveyed to a smooth roller mill 5 of conventional design, wherein, between iron rolls, the meat or kernel portions are flaked to form flakes having a thickness between about 0.2 and 0.25 mm. This small cross-sectional dimension of the flakes is obtainable only due to the fact that no larger hull particles are included in the fraction which is subjected to flaking.

The hull and linter fraction including some fine meat particles is pushed by means of a roller assembly through a die plate so as to form pellets thereof having a diameter of about 6–7 mm.

The thus pretreated or preshaped fractions are then mechanically conveyed to an extraction apparatus and jointly extracted to a residual oil content of less than 1%, for instance in a carrousel extractor such as is available from the firm Extraktionstechnik, Hamburg, Germany and described in U.S. Patent No. 3,131,202.

Due to the presence of the pellets in the extractor, together with the flaked kernels, the entire mass in the extractor will be relatively loose and thus excellently suitable for percolation. Furthermore, it is an advantage of the present invention that the hulls and linters are also subjected to extraction. In contrast thereto, when cottonseed is dehulled and separated in a conventional manner, the hulls and linters absorb oil from the meat which is thus not extracted. It is another advantage of the present invention that loose linters are bound to the hulls and fine meat particles by the pelletizing process so that no loose linters will be present during the extraction process and capable of interfering with the same. In addition, the absence of loose linters in the extracted mass greatly facilitates filtration of the same.

The extracted meal is then mechanically conveyed to a device for the removal of residual solvent such as a desolventizer toaster, for instance the device known as the Central Soya System, in order to remove residual solvent from the wet meal.

After desolventizing, the meal is pneumatically conveyed to a conventional cooler.

The cooled meal is mechanically conveyed to a separator 11 wherein the protein rich fraction consisting of flaked extracted kernels, and the protein poor fraction consisting of pelletized hulls and linters are separated from each other by screening or sifting.

It will be understood that each of the elements described above, or two or more together, may also find a useful application in other types of extraction arrangements differing from the types described above.

While the invention has been illustrated and described as embodied in an arrangement for the extraction of oil from cottonseed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of extracting oil from cottonseed comprising the steps of separating a mass of cottonseed into a first fraction consisting predominantly of cottonseed kernels and into a second fraction consisting predominantly of hulls and linters; flaking said first fraction; pelletizing said second fraction; and extracting oil from said flaked first fraction and said pelletized second fraction.

2. A method as defined in claim 1, wherein said flaked first fraction and said pelletized second fraction are combined prior to the extraction of oil therefrom.

3. A method as defined in claim 2, wherein after extraction of said combined fractions the same are substantially separated into extracted flaked kernels and extracted pellets.

4. An arrangement for the extraction of oil from cottonseed comprising, in combination, separating means for separating a mass of cottonseed into a first fraction consisting predominantly of cottonseed kernels and into a second fraction consisting predominantly of hulls and linters; flaking means operatively associated with said separating means for flaking the separated cottonseed kernels; pelletizing means operatively associated with said separating means for pelletizing said separated hulls and linters; means operatively associated with said flaking means and said pelletizing means for forming a mixture of the flakes and pellets produced in said flaking and pelletizing means; and extracting means operatively associated with said mixing means for extracting oil from the mixture formed in said mixing means.

5. An arrangement as defined in claim 4, and including second separating means operatively associated with said extracting means for separating the extracted mixture formed in said extracting means into a first fraction consisting essentially of extracted flakes and a second fraction consisting essentially of extracted pellets.

References Cited

UNITED STATES PATENTS

| | | | |
|---|---|---|---|
| 2,485,916 | 10/1949 | Perez | 260—412.4 |
| 2,594,117 | 4/1952 | Bonotto | 260—412.4 |
| 2,608,565 | 8/1952 | Bonotto | 260—412.4 |
| 2,726,253 | 12/1955 | Gastrock | 260—412.4 |
| 3,119,805 | 1/1964 | Krueger | 260—412.4 |
| 3,297,731 | 1/1967 | Hale | 260—412.4 X |

FRANK W. LUTTER, Primary Examiner.

U.S. Cl. X.R.

23—313; 99—2; 209—2; 241—10